UNITED STATES PATENT OFFICE.

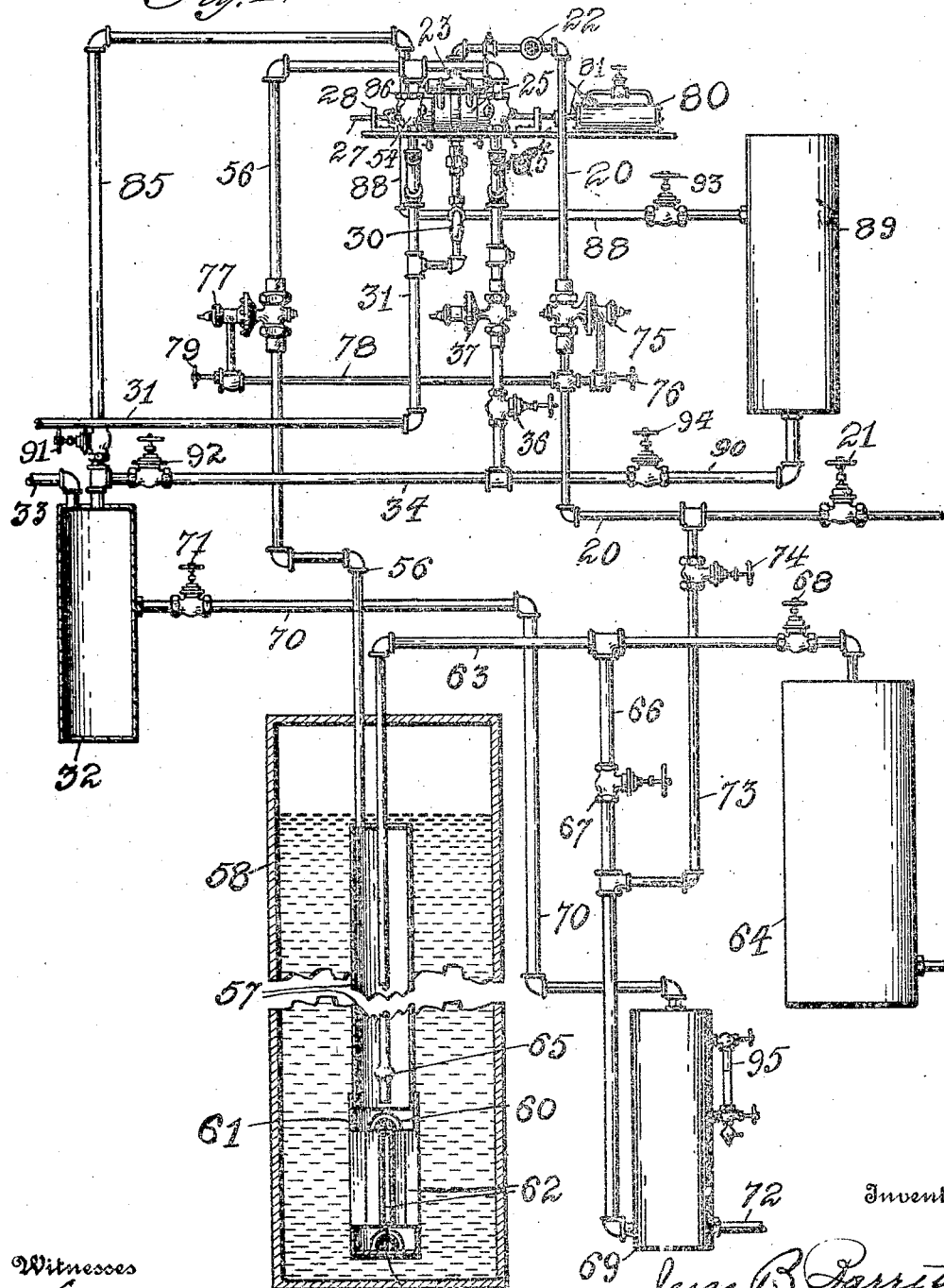

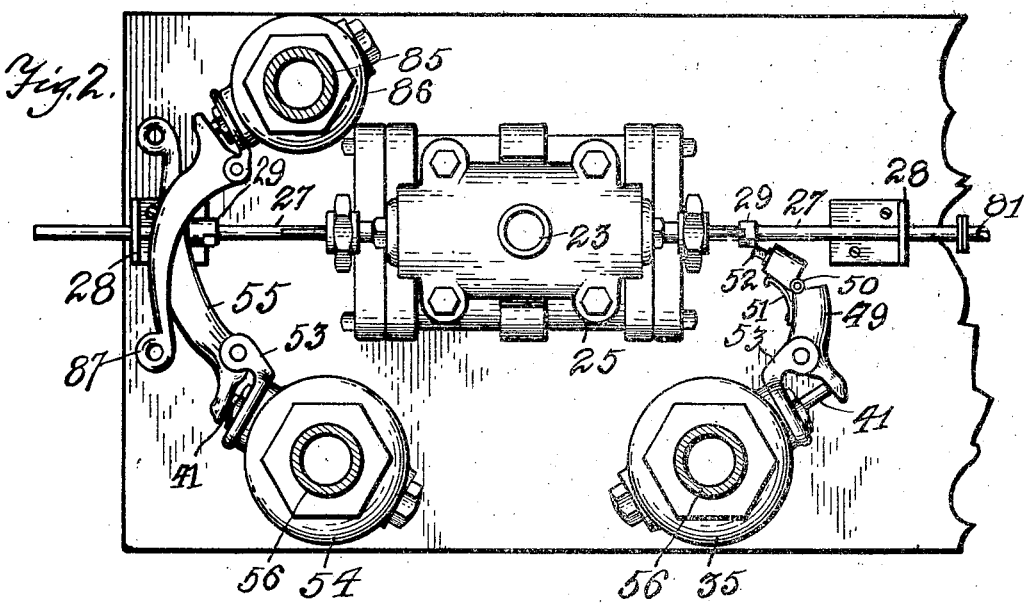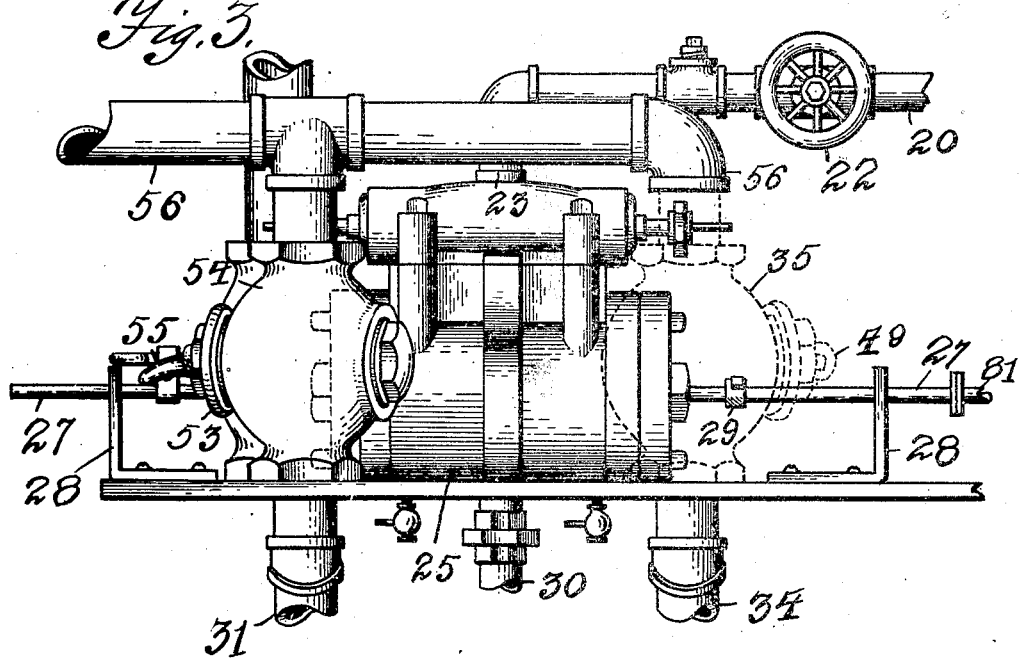

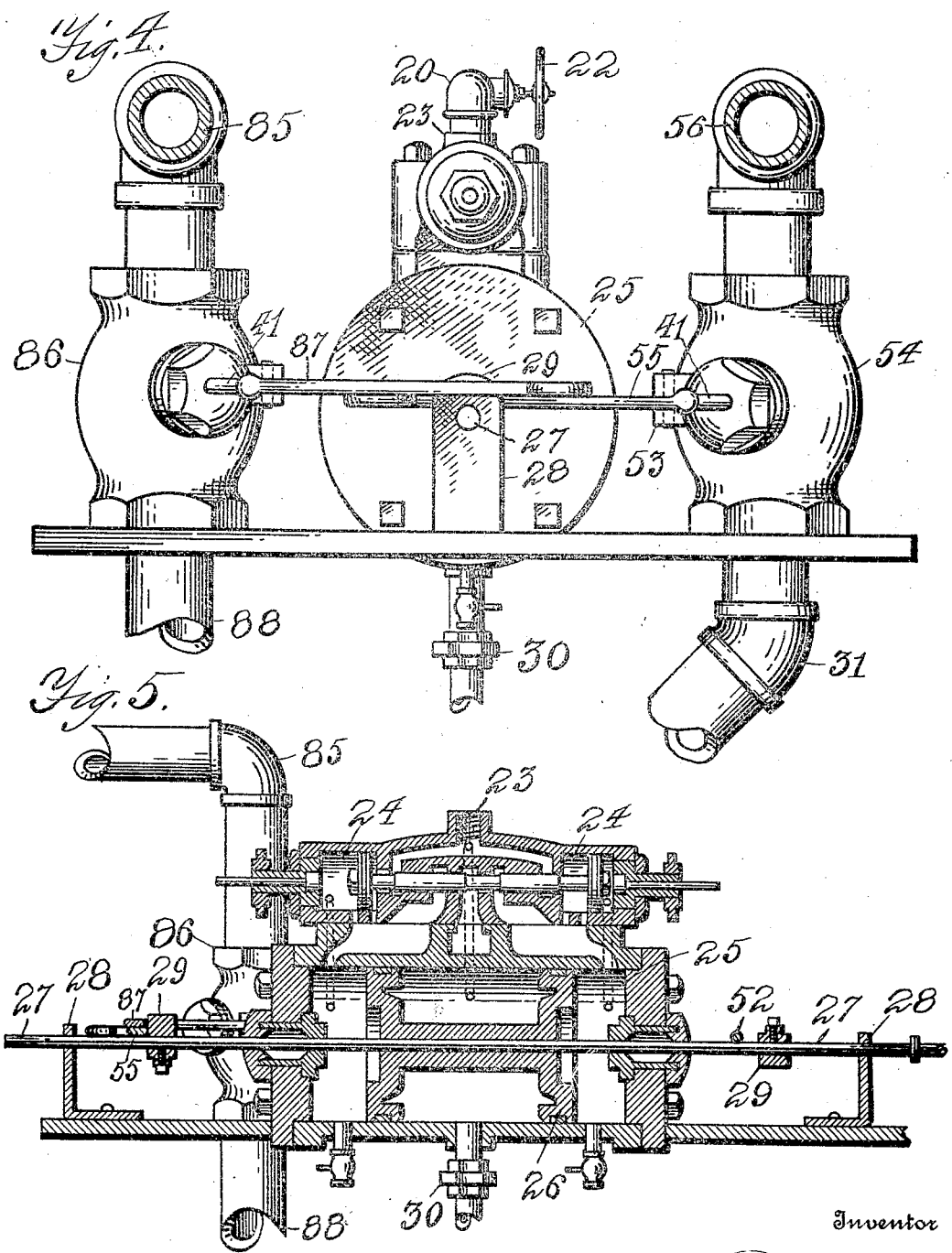

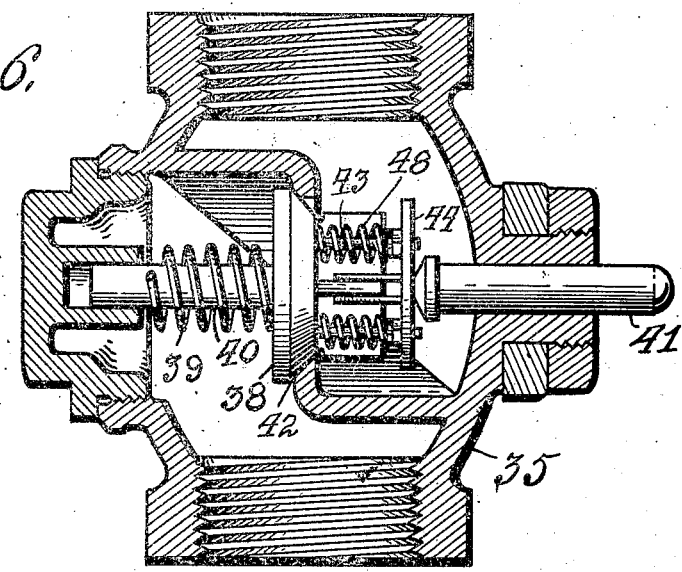
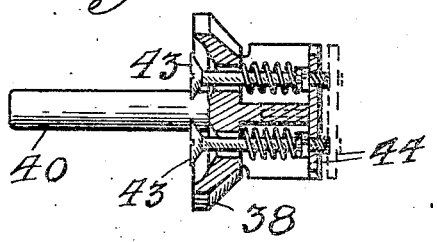
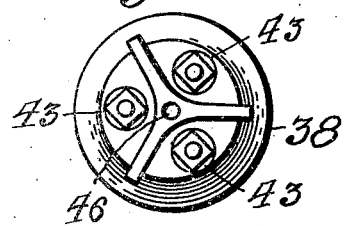
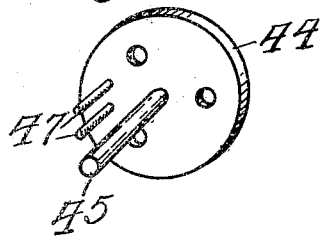
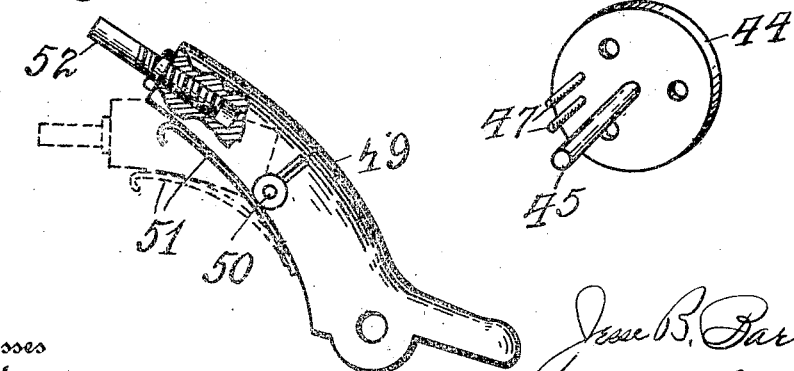

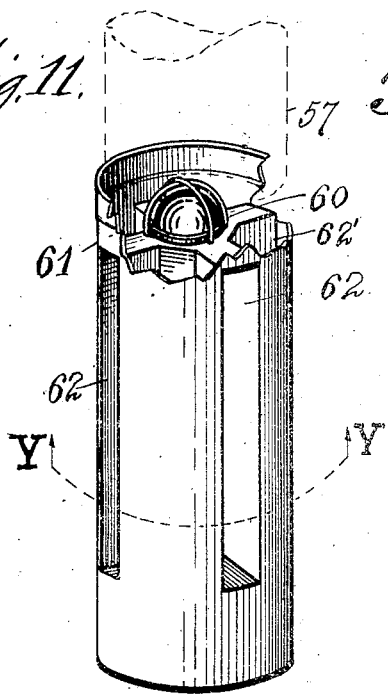
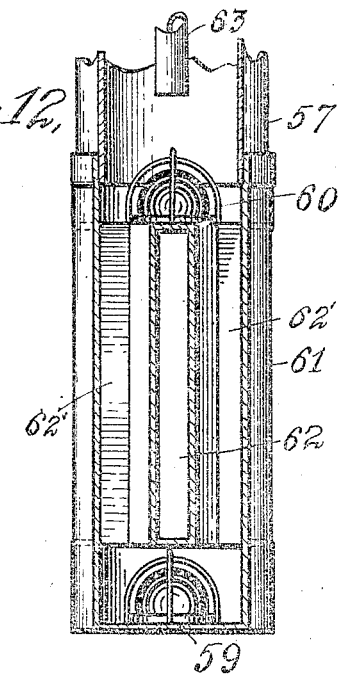
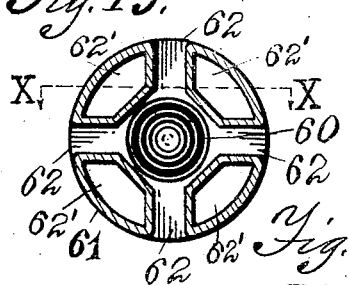
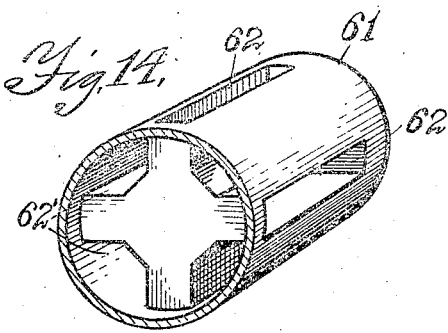
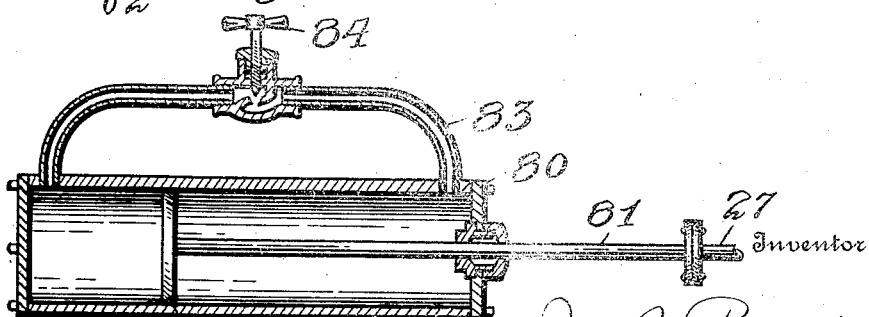

JESSE B. BARRETT, OF JAMESTOWN, NEW YORK.

COMBINED WATER AND PNEUMATIC PUMP.

1,250,417.  Specification of Letters Patent.  Patented Dec. 18, 1917.

Application filed March 5, 1915. Serial No. 12,268.

*To all whom it may concern:*

Be it known that I, JESSE B. BARRETT, a citizen of the United States, residing at the city of Jamestown, in the county of Chautauqua and State of New York, have invented certain new and useful Improvements in Combined Water and Pneumatic Pumps, of which the following, taken in connection with the accompanying drawings, is a specification.

The invention relates to improvements in pump mechanism for liquids wherein air is used for lifting the liquid; and the invention consists, first, in providing admission and exhaust valves with means for alternating operation of said valves and the pump mechanism, said means for alternating operation consisting preferably of a simplex steam pump cylinder, which may be operated by water, air or steam; second, to provide mechanism to pump directly to the service main from the pump barrel; and third, to provide connective mechanism with the pump mechanism whereby the operation of the cylinder for the alternating action of the admission and exhaust valves may be actuated by using the water pressure from the pump barrel, said operating cylinder having first been started; and the invention consists in the combination and arrangement of the parts as shown in this specification and the accompanying drawings.

In the drawings, Figure 1 is a diagrammatic view showing the different parts of the apparatus and the pipe connections therebetween with the valvular control for the same including the pump barrel in the well which is shown in section, and the storage and compression tanks.

Fig. 2 is a plan view of the alternating valvular control for the pumping system; and Fig. 3 is a side elevation of the same with one of the control valves shown in dotted outline in order to show the end of the operating cylinder; and Fig. 4 is an end elevation of the same; and Fig. 5 is a lengthwise sectional view of the alternating operating cylinder and the control valve therefor showing the construction and arrangement of the same.

Fig. 6 is a sectional view of the inlet valve; and Fig. 7 is an elevation of the inlet valve with a portion broken away to show the pilot valves thereon; and Fig. 8 is a plan view of the valve with the pilot valve control plate removed; and Fig. 9 is a perspective view of said pilot valve control plate removed from the valve.

Fig. 10 is an elevation of the jointed arm of the air inlet valve showing the construction and arrangement of the same.

Fig. 11 is a perspective view of the valve chamber or bottom portion of the pumping cylinder for the well, a portion of the top being broken away to show the valve construction and the ports; Fig. 12 is a lengthwise sectional view at line X X in Fig. 13; Fig. 13 is a crosswise sectional view at line Y Y in Fig. 11; and Fig. 14 is a perspective view of said cylinder, the bottom portion being broken away showing the closed under side of the entrance ports.

Fig. 15 is a lengthwise sectional view of the oil control cylinder for the operating cylinder.

Like numbers of reference refer to corresponding parts in the several views.

The numeral 20 designates the feed service main or line pipe with fluid under pressure flowing therethrough from a main source of fluid supply as, for example, a city water system or stand-pipe, which line pipe 20 has the shut-off valve 21 and the throttle valve 22 thereon.

The line pipe 20 enters the central portion 23 of the valve chambers 24 of the operating cylinder 25. The cylinder 25 is a common simplex steam pump cylinder which may be operated by hydraulic pressure as well as by steam or pneumatic pressure. The fluid under force on entering the cylinder 25 is conducted to the different parts through connecting ports to reciprocally move the piston 26 with its horizontal piston rod 27 attached thereto and extending through both heads of the cylinder 25 with suitable stuffing boxes.

The outer ends of the piston rod 27 are slidably supported by the guide brackets 28. The collars 29 are adjustably attached on the piston rod 27 between the guide brackets 28 and the cylinder heads at each end of the cylinder 25. As soon as the fluid has accomplished its purpose in moving the piston toward the cylinder head, it passes down through the exhaust pipe 30 to the main exhaust pipe 31.

The numeral 32 designates the air storage tank which is filled by means of an air compressor connected to the tank 32 by the pipe 33. The pipe line 34 connects the air storage tank 32 to the air inlet or admission valve 35, the pipe line 34 having the shut-off valve 36 and the pressure reducing valve 37 thereon to regulate the pneumatic pressure from the storage tank 32 at the inlet valve 35.

The inlet valve 35 is a common self-closing valve such as is used on steam whistles, and comprises the valve 38 which is normally held on the valve seat 42 by means of the spring 39 and guide stem 40, the valve stem 41 being slidably mounted in the casing of the valve so as to press the valve 38 from the valve seat 42 when it is desired to open the valve.

For a purpose hereinafter set forth, a plurality of pilot self-closing valves 43 are provided with seats in the valve 38, three being shown in the valve plate 38, as shown in Fig. 8. In order to simultaneously open the pilot valves 43, a valve control plate 44 is provided with a stem 45 which is slidably mounted in a hole 46 in the valve 38, two guide pins 47 being provided at one side and engage each side of one of the flanges of the valve 38 so as to hold the plate 44 in line.

It is now apparent that the stem 41 may be pressed against the plate 44, thereby pressing simultaneously upon all the pilot valves 43, causing them to open at the same time, and that continued movement of the valve stem 41 against the plate 44 brings the pressure against the valve 38, thereby moving said valve 38 off the seat 42. With the release of the pressure of the stem 41, the spring 39 causes the valve 38 to reseat itself on the valve seat 42, and the springs 48 of the pilot valves 43 cause said pilot valves to reseat themselves, thereby returning all the parts of the valve to the normally closed position.

The pressure upon the valve stem 41 is attained by means of a jointed arm or lever 49 which is engaged by the collar 29 on the piston rod 27 of the operating cylinder 25. The arm 49 is pivotally mounted in a bracket piece 53 on the casing of the valve 35. The arm 49 is jointed by means of a hinge 50 midway of its length at one side and a leaf spring 51 extends from the portion of the arm 49 toward the valve over onto the portion of said arm which extends toward the piston rod 27, and an adjustable pin 52 is provided in the end of said arm which is engaged by the collar 29 as it is reciprocally moved backward and forward to adjust the length of the arm 49.

An outlet or exhaust valve 54 is provided near the opposite end of the operating cylinder 25 which is precisely the same as inlet valve 35 with the exception that it does not contain the pilot valve construction. The outlet valve 54 is operated by means of an unjointed arm 55 which is hinged or pivotally attached to a similar bracket 53 on the valve casing as on valve 35 and is actuated by means of an adjustable collar 29 on the piston rod 27.

The admission of the air from the storage tank 32 through the pipe line 34 and inlet valve 35 by the action of the operating cylinder 25 in opening said valve 35 admits the air to the pipe line 56 through which it passes to the pump barrel or cylinder 57 in the well 58. The pump barrel 57 has the two inlet valves 59 and 60 therein that said barrel may fill by gravity when the air pressure is withdrawn. The lower portion 61 of the pump barrel 57 forms a valve chamber and is preferably cast in one piece with the four-way ports 62 therein leading to the upper inlet valve 60, and the inlet valve 59 is in the bottom of the valve chamber 61, providing a large admission valve area in the two valves 59 and 60 to the pump barrel 57, so that said pump barrel 57 fills quickly by gravity.

The pressure of the air through the line 56 forces the liquid out of the pump barrel 57 through the discharge pipe line 63 to the storage tank 64, and, after emptying the pump barrel, the air exhausts back through the pipe line 56 to the outlet or exhaust valve 54, hereinbefore described, to the main exhaust pipe line 31. A check valve 65 is placed near the lower end of the discharge pipe 63 to prevent the return of the liquid from the pipe line 63 or storage tank 64 to the pump barrel 57. The speed of the inlet valve 35 should be set according to the conditions at the storage tank 64 so that only liquid will be pumped into said tank. The purpose of the pilot valve 43 in valve 35 is to allow a small amount of air through the pilot valves to fill the piping and water barrel in order to seat the valves in the water barrel easily and thereby avoid any shock in the water system.

In order that my pump mechanism may be used to pump directly from the well 58 into the service main, a pipe line 66 is attached to the line 63 between the pump barrel 57 and the storage tank 64. A valve 67 is provided on the line 66 so as to close the pipe line 66 when it is desired to pump into the storage tank 64. A valve 68 is provided on the pipe line 63 between the line 66 and the storage tank 64 to be closed when it is desired to turn the water into the line 66. The line 66 leads to a compression tank 69 which is provided with air pressure by means of a pipe line 70 from the air storage tank 32, a control valve 71 being provided on the line 70 for charging the tank 69. A liquid tube or water glass 95 is provided on tank 69. The service main 72 leads directly from the compression tank 69, and it is apparent that the intermittent action from the filling and emptying of the pump barrel 57 would cause pulsation in the service main 72, but the compression tank 69 will hold an even pressure on the service main 72 for the drawing of liquid at the different spigots.

It is apparent, however, that the air pressure from the pump barrel 57 must not be permitted to escape into the service main when pumping directly thereto. Accordingly, the amount of air admitted to the pump barrel 57 must be exactly proportioned to the capacity of said pump barrel or there may be danger under certain conditions of the escape of the air into the service main. In order to so measure the air when pumping into the service main, a pipe line 85 connects the air storage tank 32 to a valve 86 opposite the exhaust valve 54 and exactly similar in construction and having an unjointed operating arm 87 which extends over the arm 55 of the valve 54 and is reciprocally moved simultaneously therewith by means of the collar 29 on the piston rod 27. The valve 86 is connected by a pipe line 88 to a tank 89 having a capacity corresponding to the charge of air desired for the pump barrel 57. The tank 89 is connected by a pipe line 90 to the pipe line 34. Shut-off valves 91, 92, 93 and 94 are provided on pipe lines 85, 34, 88 and 90 in order to control said lines when it is desired to change from pumping into the storage tank 64 to pumping directly into the service main or the reverse.

Thus when it is desired to pump into the service main, the valve 91 is opened and the valve 92 is closed. This turns the air into pipe line 85 and to the valve 86, thence through the pipe line 88, valve 93 being open, to the storage tank 89, and valve 94 being open, it is apparent that the exact amount of air will be admitted to the pipe line 34 and the admission valve 35 and pump cylinder 57, which is necessary to operate said pump cylinder, thereby overcoming any danger of over-volume of air in the pump cylinder 57 yet permitting the exact amount desired for the operation of said pump cylinder, since the valve 86 is operated by the operating cylinder 25 simultaneously with the exhaust valve, that is, while the admission valve 35 is closed the exact amount of air necessary to fill the tank 89 is admitted through the valve 86, which valve is then closed, thereby permitting only the amount of air in the tank 89 to be admitted to the pump cylinder 57, the alternating action of the operating cylinder 25 being used to admit the measured charge of air to the tank 89 and closing the same so as to act as an automatic stop or guard against air in the service main.

When it is desired to use the pressure of the liquid from the well barrel 57 for operating the cylinder 25, the valve 68 is closed and the valve 67 opened admitting the liquid to a pipe line 73 which connects the line 66 below the valve 67 to the pipe line 20 between valve 21 and the throttle valve 22. A cut-off valve 74 is provided on the line 73 between the lines 66 and 20 for the closure of the line 73 when it is desired to use the regular feed pipe 20. The cylinder 25 is first started by the feed line 20 or some other means until it has attained sufficient pressure in the pipe lines 63, 66 and 73 to operate the cylinder 25, after which the valves 21 are closed and valve 74 is opened and the pressure in the pump barrel 57 will then be transferred directly to the operating cylinder 25.

In order to regulate the pressure of the liquid on the cylinder 25, a pressure regulating valve 75 is provided on the pipe line 20 with a shut-off valve 76. A regulating valve 77 is also placed on the pipe line 56 leading from the valve 35 to the pump barrel 57, and the pressure of the fluid in the line 20 is connected by a cross pipe line 78 and shut-off valve 79 to the regulating valve 77 so that the liquid pressure in the line 20 will also control the air pressure in the line 56. Thus the two regulating valves 75 and 77 under high pressure will close the inlet pipe line 20 for the fluid under pressure to the operating cylinder 25 and also close the air supply to the pump barrel 57 through the pipe line 56. By this arrangement the pressure may be set at a desired point and when a spigot is opened on the service main 72 and a sufficient amount of liquid is drawn to reduce the pressure to the minimum on the regulating valves 75 and 77 they will open, thereby permitting the operation of the pump mechanism and said operation of the same will continue until the maximum pressure is again attained, at which point the pump mechanism will be stopped by the high pressure closing of the regulating valves 75 and 77. The regulating valve 37 is adjusted to the required pressure in the pump barrel 57 and will regulate the flow of the air through the pipe line 34 to the valve 35 between maximum and minimum pressures.

The arm 49 is jointed to render the pumping mechanism as efficient as possible, that is, to enable said mechanism to pump the largest amount of liquid with the least amount of air and consequently of power. The action of the arm 49 is as follows: As the piston rod 27 is moved outward by the liquid under force in the operating cylinder 25, the collar 29 on the rod 27 engages the arm 49 thereby opening the valve 35 and admitting a charge of air to the pump cylinder 57. The arm 49 is adjusted as to length by means of the threaded pin 52 so that when the required amount of air has been admitted to the pump cylinder 57, the arm 49 will slip past the collar 29 permitting said collar to pass on to the end of its outward movement and the valve 35 to automatically close. As the rod 27 and collar 29 pass back toward the cylinder 25 the collar 29 will engage the spring arm 49 and said arm will bend at the hinged joint 50, thereby allowing the collar 29 and rod 27 to pass without opening the valve 35 or admitting additional air under force, and will then spring back to the normal extended position. This gives the admitted charge of air sufficient time to attain its full expansive force before passing out through the exhaust valve 54. As the piston rod 27 is again moved out the arm 49 is in position for admitting another charge of air.

It is accordingly apparent that by adjusting the length of the arm 49 the amount of air desired for the charge in the pump cylinder 57 may be adjustably approximated. This, however, does not take the place of the measuring tank 89 when pumping directly to the service main 72, since the tank 89 is needed to measure the exact amount of air to empty the pump cylinder 57 and thus avoid any deficiencies in mechanism, or in the operation of said mechanism.

The combined area of the valves 59 and 60 should approximate or nearly approximate the cross-sectional area of the cylinder or pump barrel 57, so that when the pump barrel is emptied of liquid by the charge of air said barrel will fill by gravity as quickly as possible. Accordingly, in the valve chamber 61 the area of the walled ports 62 is made sufficiently large to provide a full flow of liquid through the valve 60 in the upper wall of said ports, and the area of the passages 62' formed in said valve chamber by said walled ports 62 must approximate the area of the valve 59. This arrangement of the two valves 59 and 60 in the valve chamber 61 gives the desired valve area in relation to the cylindrical pump barrel 57 and forms a construction which is applicable to small tubular pump barrels in driven wells and similar confined spaces.

When it is desired to use air or steam in the operating cylinder 25, an oil cylinder 80 is attached to one end of the piston rod 27 by means of the piston rod 81 so that said piston rod 81 operates the piston 82 in the oil cylinder. The opposite ends of said oil cylinder 80 are connected by a pipe 83 with a pin valve 84 thereon by means of which the pressure of the air or steam in the cylinder 25 may be cushioned so as to give uniform motion.

It is obvious that any number of wells may be operated by one alternating operating cylinder by the simple installation of a well barrel in each well and pipe connection to the central operating cylinder, provided a sufficient volume of air is admitted to operate all the pumps.

I claim as new:

1. In a pneumatic pump, the combination with an operating cylinder having piston rods slidably extending out through each cylinder head, collars on said piston rods, an inlet self-closing valve for air at one end of said cylinder, an outlet valve for air at the other end of said cylinder, arms engageable by the collars to alternately open said inlet and outlet valves, said operating arm for said inlet valve jointed to actuate said inlet valve when moved in one direction only.

2. In a pneumatic pump, the combination with a tank for air under pressure, a pump barrel connected to said tank to receive air under pressure therefrom, means for the alternate admission and exhaust of said air to and from said pump barrel to force the water therefrom, an inlet valve in the bottom of said pump barrel, said pump barrel having ports extending therethrough above said inlet valve, a second inlet valve in the upper wall of said ports, and a discharge pipe from said pump barrel.

3. In a pneumatic pump, the combination with a tank for air under pressure, a pump barrel connected to said tank to receive air under pressure therefrom, means for the alternate admission and exhaust of said air to and from said pump barrel to force the water therefrom, a valve chamber on the lower end of said pump barrel having walled ports therethrough at right angles to one another, a ball valve central of the bottom of said valve chamber beneath said ports, a second ball valve central of the upper wall at the crossing of said ports to admit the water to said pump barrel, and a discharge pipe from said pump barrel.

4. In a pneumatic pump, the combination with a tank for air under pressure, a pump barrel connected to said tank to receive air under pressure therefrom, means for the alternate admission and exhaust of said air to and from said pump barrel to force the water therefrom, an inlet valve in the bottom of said pump barrel, said pump barrel having ports extending therethrough above said inlet valve, a second inlet valve in the upper wall of said ports, a discharge pipe extending downwardly into said pump barrel from the top to a spaced distance above said ports, a check valve in the lower end of said discharge pipe within said pump barrel, and a storage tank connected to said discharge pipe to receive the water from said pump barrel.

5. In a pneumatic pump, the combination with a tank for air under pressure, a pump barrel connected to said air tank by piping to receive air under pressure therefrom, self-closing inlet and outlet valves on said piping to admit and exhaust the air from said pump barrel, a third self-closing valve connected to said tank, a measuring tank connected to said third valve and to the inlet valve to measure the charge of air delivered to said inlet valve and pump barrel, an operating cylinder with extended piston rods at each end, arms pivotally attached to said inlet and outlet valves to alternately open the same, an arm pivotally attached to said third valve to open said third valve with said outlet valve, adjustable collars on said piston rods engaged alternately by said arms to open said valves, inlet valves for the water in said pump barrel, and a discharge pipe from said pump barrel.

6. In a pneumatic pump, the combination with a tank for air under pressure, a pump barrel connected to said air tank by piping to receive air under pressure therefrom, self-closing inlet and outlet valves on said piping to admit and exhaust the air from said pump barrel, a third self-closing valve connected to said tank, a measuring tank connected to said third valve to measure the charge of air delivered to said inlet valve and pump barrel, an operating cylinder with extended piston rods at each end, adjustable collars on said piston rods, arms pivotally attached to said inlet and outlet valves engaged by said collars to alternately open the same, an arm pivotally attached to said third valve engaged by the collar for said outlet valve to open said third valve with said outlet valve, inlet valves for the water in said pump barrel, a discharge pipe extending into said pump barrel and connected to the service main, a check valve on said discharge pipe, a compression tank on said discharge pipe connecting to said service main, and pipe and valve connection to said compression tank from said air tank to equalize the pressure on said service main.

7. In a pneumatic pump, the combination with a tank for air under pressure, a pump barrel having valves for filling said barrel by gravity, a discharge pipe from said pump barrel, pipe line connection between said air tank and pump barrel, hydraulic mechanism connected to a feed service main, for the alternate admission and exhaust of charges of air on said pipe line, connected pressure regulating valves in said feed service main and said pipe line to be simultaneously actuated by the hydraulic pressure in said main, and an air pressure reducing valve on the pipe line from said air tank.

8. A pump barrel comprising a receptacle, a valve chamber on the lower end of said receptacle, a valve in the bottom of said chamber, walled ports extending into said valve chamber, and a second valve in the upper wall of said ports.

9. A pump barrel comprising a cylindrical receptacle, walled ports through the lower portion of said cylindrical receptacle, a valve in the upper wall of said ports, a second valve in the bottom of said receptacle, the area of said valves approximating the cross-sectional area of said cylindrical receptacle.

10. A pump barrel comprising a cylindrical receptacle, a valve chamber on the lower end of said receptacle, vertical intersecting walled ports extending through said valve chamber to form vertical passages between the inner walls thereof and the wall of said chamber, a valve in the upper wall of said ports at the point of their intersection, a second valve in the bottom of said chamber, the area of said valves approximately equaling the cross-sectional area of said cylindrical receptacle to fill said cylindrical receptacle by gravity as quickly as possible.

11. In a pump, in combination, an air pressure supply, a water supply, a pump barrel having valved inlet and outlet ports, the inlet port connected with the water supply, a compression tank connected with the outlet port to receive liquid from the pump barrel, means connecting the tank to the air supply for admitting pressure to the former for expelling the liquid therefrom, and pressure-operated means under the control of the liquid pressure from the pump barrel for opening and closing communication between the air pressure supply and pump barrel.

12. In a pump, in combination, an air pressure supply, a water supply, a pump barrel having valved inlet and outlet ports, the inlet port connected with the water supply, a compression tank connected with the outlet port to receive liquid from the pump barrel, means connecting the tank to the air supply for admitting pressure to the former for expelling the liquid therefrom, an inlet valve between the air pressure supply and pump barrel, an exhaust valve for the latter also in the connection between the supply and barrel, and pressure-operated mechanism arranged between the inlet and outlet valves for successively operating them.

13. In a pump, in combination, an air pressure supply, a water supply, a pump barrel having valved inlet and outlet ports, the inlet port connected with the water supply, a compression tank connected with the outlet port to receive liquid from the pump barrel, means connecting the tank to the air supply for admitting pressure to the former for expelling the liquid therefrom, an inlet valve between the air pressure supply and pump barrel, an exhaust valve for the latter also in the connection between the supply and barrel, and pressure-operated mechanism connected to the outlet port of the pump barrel for operation by the liquid pressure and arranged between the inlet and outlet valves for successively operating them.

14. In a pump, in combination, a pump barrel, an air supply, a pipe leading from the latter to the former, an inlet valve in the pipe for controlling the supply of air to the barrel, an exhaust valve also in the pipe and spaced from the inlet valve, and a simplex fluid-operated motor including a reciprocatory piston rod, and separate means connected to the rod and to the respective valves for alternately opening and closing the valves.

15. In a pump, in combination, a pump barrel, an air supply, a measuring compartment, piping connecting the latter to the supply and to the pump barrel, a valve in the piping between the supply and compartment, pressure operated means for opening and closing the valve, an inlet valve in the piping between the compartment and pump barrel also controlled by the aforesaid means, and an exhaust valve under the control of said means arranged in the piping connecting said barrel and compartment.

16. In a pump, in combination, a pump barrel having valved fluid inlet and outlet ports, an air pressure supply, piping connecting the two, a valve for opening and closing communication between the supply and barrel, a conduit leading from the outlet of the pump barrel, a fluid operated device for intermittently opening and closing the valve, and means connecting the device with the outlet conduit of the barrel.

17. In a pump, in combination, a pump barrel having valved fluid inlet and outlet ports, an air pressure supply, piping connecting the two, a valve for opening and closing communication between the supply and barrel, a conduit leading from the outlet of the pump barrel, a fluid operated device for intermittently opening and closing the valve, means connecting the device with the outlet conduit of the barrel, a pressure regulating valve in said piping, and a pressure-regulating valve in the said means having a controlling connection with the first pressure-regulating valve.

18. In a pump, in combination, a pump barrel, an air supply, a measuring compartment, piping connecting the latter to the supply and to the pump barrel, a valve in the piping between the supply and compartment, pressure operated means for opening and closing the valve, an inlet valve in the piping between the compartment and pump barrel also controlled by the aforesaid means, an exhaust valve under the control of said means arranged in the piping connecting said barrel and compartment, and means connecting the outlet side of the pump barrel to the first means.

19. In a pump, in combination, a pump barrel having an air inlet and water inlet and outlet ports, an air pressure supply, means connecting said supply to the barrel, an inlet valve in the connecting means controlling the admission of air pressure to the pump barrel, an independently operable exhaust valve arranged in the connecting means between the barrel and inlet valve, means including a reciprocatory piston rod, and separate means connected to the rod and to the respective valves for intermittently opening and closing the valves in succession.

In testimony whereof I have affixed my signature in the presence of two witnesses.

JESSE B. BARRETT.

Witnesses:
  H. A. SANDBERG,
  HAROLD FORSBERG.